United States Patent
Jahnke et al.

(10) Patent No.: US 8,525,101 B2
(45) Date of Patent: *Sep. 3, 2013

(54) POSITION TRANSMITTER HAVING A NORMAL MODE AND A POWER SAVING MODE OPERATION FOR THE ACQUISITION OF THE POSITION OF A ROTATABLE SHAFT

(75) Inventors: Siegfried Jahnke, Deisslingen (DE); Gunter Rapp, Trossingen (DE); Michael Schneider, Constance (DE)

(73) Assignee: Baumer IVO GmbH & Co. KG, Villingen-Schwenningen (DE)

( * ) Notice: Subject to any disclaimer, the term of this patent is extended or adjusted under 35 U.S.C. 154(b) by 275 days.

This patent is subject to a terminal disclaimer.

(21) Appl. No.: 12/900,897

(22) Filed: Oct. 8, 2010

(65) Prior Publication Data

US 2011/0084200 A1    Apr. 14, 2011

(30) Foreign Application Priority Data

Oct. 9, 2009 (EP) .................................... 09012832

(51) Int. Cl.
*G01D 5/34* (2006.01)

(52) U.S. Cl.
USPC .................................. 250/231.13; 250/231.18

(58) Field of Classification Search
USPC ........ 250/231.13–231.18, 239, 216; 384/448; 341/2, 9, 10, 16; 324/207.2–207.25
See application file for complete search history.

(56) References Cited

U.S. PATENT DOCUMENTS

| 4,945,231 A | 7/1990 | Ohya et al. |
| 4,988,945 A * | 1/1991 | Nagase .......................... 324/175 |
| 5,212,380 A | 5/1993 | Sato et al. |
| 2005/0236561 A1 | 10/2005 | Hin et al. |
| 2008/0157705 A1 | 7/2008 | Sasaki et al. |

FOREIGN PATENT DOCUMENTS

| DE | 19849108 A1 | 6/2000 |
| DE | 10354469 A1 | 6/2005 |
| DE | 102007062780 A1 | 7/2008 |
| EP | 0502534 A2 | 9/1992 |
| EP | 0911610 A1 | 4/1999 |
| EP | 1279932 A2 | 1/2003 |
| EP | 1462771 A2 | 9/2004 |
| WO | 2009/047508 A2 | 4/2009 |

OTHER PUBLICATIONS

Search Report dated May 6, 2010 for EP Patent Application No. 09012831, 2 pages.
Search Report dated Oct. 5, 2010 for EP Patent Application No. 09012831, 1 page.
Search Report dated Jun. 10, 2010 for EP Patent Application No. 09012382, 2 pages.

* cited by examiner

*Primary Examiner* — Que T Le
(74) *Attorney, Agent, or Firm* — McGlew and Tuttle, P.C.

(57) ABSTRACT

This invention relates to a position transmitter for the acquisition of the position of a shaft, rotatable about an axis of rotation, with a first optical sensor arrangement for the acquisition of the single-turn position of the shaft, and a second optical sensor arrangement for the acquisition of the multi-turn position of the shaft.

14 Claims, 2 Drawing Sheets

POSITION TRANSMITTER HAVING A NORMAL MODE AND A POWER SAVING MODE OPERATION FOR THE ACQUISITION OF THE POSITION OF A ROTATABLE SHAFT

CROSS-REFERENCE TO RELATED APPLICATION

This patent application claims priority to European Patent Application No. 09012832.3, filed Oct. 9, 2009, the entire disclosure of which is incorporated by reference herein in its entirety.

FIELD OF THE INVENTION

This invention relates to a position transmitter for the acquisition of the position of a shaft which is rotatable about an axis of rotation.

STATE OF THE ART

Position transmission devices are used generally for the monitoring and control of mechanical movement processes. For example, position transmitters are used for the acquisition of rotational speed and the control of motors. Position transmitters for the determination of angular positions through the non-contacting single or multi-turn scanning of a rotatable shaft are known in various embodiments.

The publication EP 0550794 describes a position transmitter for the absolute-value position acquisition of a rotatable shaft, with a first sensor arrangement and a first evaluation unit for the acquisition and evaluation of the exact position of the shaft during a complete revolution, i.e. the single-turn position, and with a second sensor arrangement and a second evaluation unit for the acquisition and evaluation of the number of complete shaft revolutions carried out, i.e. the multi-turn position. In addition a third evaluation unit is provided for forming an overall absolute value from the single-turn and from the multi-turn position value and for the output of this overall absolute value to a higher level system.

The acquisition of the single-turn position here occurs optically, i.e. a material measure connected to the shaft influences, depending on its position, the signals of an arrangement of photodiodes which are illuminated by an LED. The acquisition of the multi-turn position here occurs magnetically, i.e. a material measure connected to the shaft influences, depending on its position, the signals of magnetic switching elements. On switching off or with the failure of the external voltage supply to the position transmitter, the acquisition of the single-turn position is switched off. The supply to the multi-turn acquisition continues to be maintained, provided by a battery in the position transmitter. For the limitation of the power consumption the switching elements are wired in series with a very high ohmic resistance, but are continuously supplied with current. Switching the switching elements on and off occurs depending on the position.

The publication EP 1462771 describes another position transmitter. The acquisition of the single-turn position occurs magnetically via a permanent magnet fixed centrally on the rotational axis and a rotationally fixed magnetic sensor arrangement. The acquisition of the multi-turn position also occurs magnetically. For the reduction of the power consumption the evaluation unit only applies the current/voltage periodically to the sensor parts for the time period of the measurement. The evaluation is carried out by a microcontroller. This microcontroller is operated during the pauses between the scannings in a power-saving mode with reduced clock frequency and with the peripherals turned off.

Due to the magnetic principle of the multi-turn acquisition of position transmitter devices known from the state of the art, substantial disadvantages arise however when a position transmitter of this nature is employed in the vicinity of a magnetic brake and the coupling of the magnetic field in the switching elements leads to erroneous switching pulses.

DESCRIPTION OF THE INVENTION

With respect to the state of the art, the object of this invention is to realise a position transmitter which is insensitive to external magnetic fields. In further developments of the invention the most compact and economical construction and the longest possible service life are to be achieved through an optimised design and optimised operation of the sensor arrangements as well as through the acquisition and evaluation electronics.

The above mentioned object is solved by a position transmitter for the acquisition of the position of a shaft which is rotatable about an axis of rotation, comprising a first optical sensor arrangement for the acquisition of the single-turn position of the shaft, and a second optical sensor arrangement for the acquisition, in particular for the gearless acquisition, of the multi-turn position of the shaft.

The claimed measurement device relates to a position transmitter for the acquisition of the position of a shaft, rotatable about an axis of rotation, comprising a first optical sensor arrangement for the acquisition of the single-turn position of the shaft, and a second optical sensor arrangement for the acquisition, in particular for the gearless acquisition, of the multi-turn position of the shaft.

The first and the second optical sensor arrangements here comprise preferably light-sensitive elements, such as for example, photodiodes or phototransistors. The acquisition of the multi-turn position thus also occurs optically. This facilitates complete insensitivity of the position acquisition to magnetic fields.

In a further development the position transmitter according to the invention can furthermore comprise an illumination device, in particular a light-emitting diode arrangement with at least one light-emitting diode. The light-emitting diode arrangement can, for example, have exactly one light-emitting diode, the light of which is acquired by both sensor arrangements. In another embodiment one or a plurality of light-emitting diodes can be provided for the sensor arrangements in each case.

In another further development the position transmitter can furthermore comprise at least one, in particular exactly one, material measure joined to the shaft. The material measure, which is rotationally fixed to the shaft, can include means of single-turn acquisition as well as additional means for multi-turn acquisition. In this way no separate material measure is required for the multi-turn acquisition, which in turn reduces the number of parts and increases the service life and compactness of the position transmitter.

In another further development the at least one material measure joined to the shaft can comprise a first material measure and a second material measure, whereby the first material measure is suitable for the acquisition of the single-turn position and the second material measure for the acquisition of the multi-turn position. In this way the second material measure can be formed, for example, as a simple interrupting disc for a separate light-emitting diode arrangement for the multi-turn acquisition.

In another further development the at least one material measure can have an arrangement which interrupts the light path to the second optical sensor arrangement corresponding to a part of a whole revolution. In this way a multi-turn position can be acquired, for example in quarter, half or whole revolutions.

Another further development is that the position transmitter comprises a first evaluation unit for the evaluation of the single-turn position, a second evaluation unit for the evaluation of the multi-turn position and a control/evaluation unit for the processing of the single-turn position and the multi-turn position. Thus preconditioning of the signals from the first and the second optical sensor arrangements can take place in the first or second evaluation unit and the calculation of an overall absolute value can then take place in the control/evaluation unit.

In another further development the position transmitter can have at least two operating modes, whereby the at least two operating modes comprise a normal mode on applying an external power supply and a power-saving mode when the external voltage supply is switched off or fails. To reduce the power consumption, provision is made that the operating mode of the multi-turn position acquisition is adapted on switching off or failure of the external voltage supply, i.e. that for example only pulse measurements are carried out (that is, short measurements in comparison to the period of revolution). In addition provision can be made that the single-turn position acquisition is partially or completely switched off.

Advantageously, the position transmitter can be configured such that in the power-saving mode the acquisition of the multi-turn position is solely carried out with the second optical sensor arrangement and/or that in the power-saving mode the first optical sensor arrangement and/or the first evaluation unit is switched off.

According to a further advantageous embodiment, alternatively or cumulatively in the normal mode, the multi-turn position can be determined also via the first sensor arrangement, in particular the multi-turn position can be determined with the first sensor arrangement and the second sensor arrangement and a comparison of the two determined positions can be carried out.

Due to the two previously mentioned further developments the acquisition of the revolutions can be limited to the time without an external voltage supply and in the time with external voltage supply also taken over by the position acquisition within one revolution, whereby a continuous data comparison with diagnosis possibilities is provided.

In another further development the position transmitter can furthermore comprise a power source, in particular in the form of a non-rechargeable or rechargeable battery.

In this respect, firstly the second sensor arrangement and/or the illumination device can be supplied with voltage at least partially in the power-saving mode. Since, for example, the photodiodes of the optical sensor arrangement have a negligible power consumption provision is preferably made that it is continuously supplied with current/voltage.

Secondly, if a power source of this nature is provided, a device for monitoring the external voltage supply and for switching over the power supply of the position transmitter to the voltage source (17) can be provided when switching off or with the failure of the external power supply.

For an efficient reduction of the power consumption it is moreover practicable to operate the actual actuator with high power consumption, i.e. the operation of the illumination device (e.g. LED), in dependence of the operating state with a variable switch-on time, such as for example periodically or pulsed with a variable frequency. In contrast to the state of the art, here periodic operation of the actuator, not the sensor, occurs.

Another further development arises in that the second optical sensor arrangement can be supplied with voltage constant in time and/or the illumination device variable in time, in particular periodically or pulsed with a variable frequency.

In another further development the position transmitter can furthermore comprise a movement measurement device, with which the speed and/or the acceleration of the shaft can be measured so that, depending on the measurement, the time-variable voltage supply of the illumination device, in particular the frequency and/or frequency of occurrence and/or duration of the voltage supply, can be realised. In addition a plurality of operating modes or a plurality of operating frequencies can be provided for controlling the LED. In this way a particularly advantageous power-saving mode can be realised, because on switching off or with failure of the external voltage supply, the shaft does not rotate or only with a low speed and acceleration.

Another further development arises in that the control and evaluation unit can be configured to carry out the time-variable voltage supply of the illumination device.

In another further development the first and second optical sensor arrangements can be integrated on a sensor component, in particular an ASIC.

Another further development arises in that the control and evaluation unit can be similarly integrated into the ASIC. In this way the number of components in the position transmitter can be reduced and the service life substantially increased. Simultaneously, the space required by the sensors and electronics is reduced.

Further features and advantages of this invention are described in the following with reference to the figures, which only illustrate examples of embodiments and do not in any way represent the complete extent of the invention. It is self-evident that the illustrated features can be used within the scope of the invention in combinations other than as described in the examples.

DESCRIPTION OF THE EMBODIMENTS

Optical scanning is used to acquire the single-turn position. The acquisition of the multi-turn position also occurs optically. This is new with respect to the state of the art described in the publications EP 0550794 and EP 1462771 and it facilitates complete insensitivity of the position measurement with respect to magnetic fields.

Since now both the single-turn and the multi-turn position acquisition are realised with optical sensor arrangements, there is also the possibility that both sensor arrangements can be arranged integrated on the same sensor module. Additionally, other devices, such as for example evaluation units, interfaces, output drivers as well as units for the operation, actuation and diagnosis of the LED, can also be integrated on this sensor module. In this way the number of components of the position transmitter can be extensively reduced and the service life or the MTTF (Mean Time To Failure) can be substantially increased. Simultaneously, the space required by the sensors and electronics is reduced.

The material measure for the single-turn acquisition, which is rotationally fixed to the shaft, can now also include means for the multi-turn acquisition. In this way no separate material measure is required for the multi-turn acquisition, which in turn reduces the number of parts and increases the service life and compactness.

To reduce the power consumption provision is made that the multi-turn position acquisition only carries out pulse measurements when the external voltage supply is switched off or fails. The photodiodes of the optical sensor arrangement of European Patent No., EP 1462771, have a negligible power consumption, and thus, they are preferably continuously supplied with current/voltage. For an efficient reduction of the power consumption it is more practicable to operate the actuator with high power consumption, i.e. the operation of the LED, in dependence of the operating state with a variable switch-on time, such as periodically or pulsed with a variable frequency. In contrast to European Patent No. EP 1462771, in the present case, periodic operation of the actuator, not the sensor, occurs.

If complete evaluation in an application specific integrated circuit (ASIC) is intended, the revolution acquisition can also be limited to the time without an external voltage supply and it can also be taken over in the time with external voltage supply by the position acquisition within one revolution, whereby a continuous data comparison with diagnosis possibilities is provided.

The power-source for the operation of the revolution counter on the switch-off or the failure of the external voltage supply can, for example, be an internal or external non-rechargeable battery or an external or internal rechargeable battery.

Figure 1:
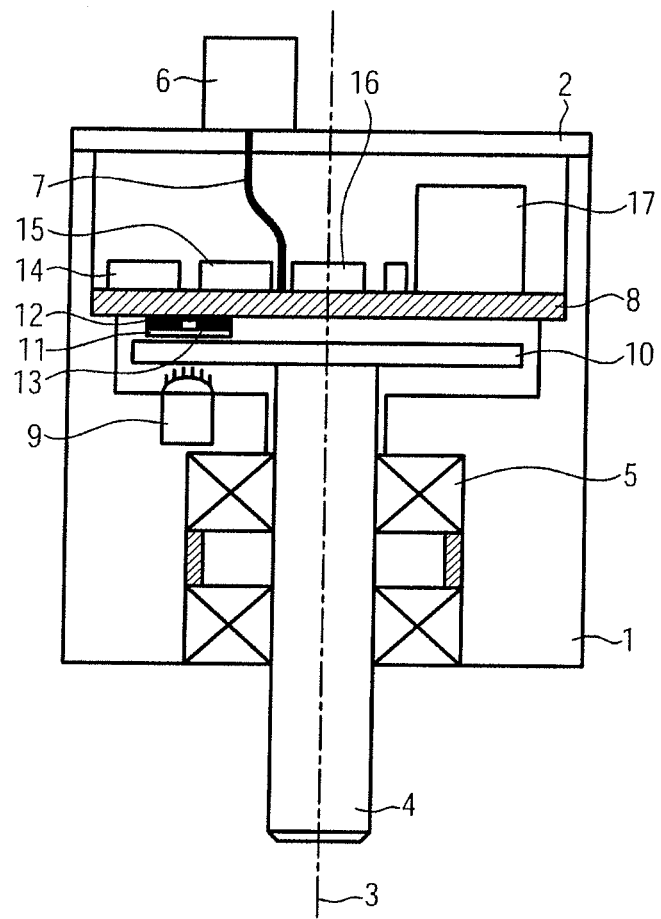
FIG. 1 illustrates components of an example of a position transmitter device according to the invention.

FIG. 1 is a position transmitter device according to the invention as illustrated in an example of this invention.

The acquisition of the single-turn position within a revolution is realised with a sensor arrangement 12 with light-sensitive elements, for example with photodiodes or phototransistors, which can be illuminated through an optical material measure 10 by a light-emitting diode arrangement 9.

For example, in this embodiment a first evaluation unit 14 for the evaluation of the single-turn position, a second evaluation unit 15 for the evaluation of the multi-turn position (preconditioning of the measurement signals) and a control and evaluation unit 16, e.g. for the determination of an overall absolute value for the shaft position (further processing of the signals from the first and second evaluation units 14, 15), are provided.

The light-emitting diode arrangement 9 is actuated as required by the control and evaluation unit 16, for example a microcontroller, via constant current sources depending on the operating situation of the position transmitter. Also the evaluation and further processing of the single-turn position is actuated as required by the control and evaluation unit 16 depending on the operating situation of the position transmitter.

The evaluation and further processing of the single-turn position is carried out as required by the control and evaluation unit 16 similarly according to the operating situation of the position transmitter. With the application of the external voltage supply, i.e. in normal operation, the single-turn position can also be used alternatively or additionally for the acquisition and evaluation of the multi-turn sensor arrangement. In this way errors can be detected and the dependability of the scanning increased.

The acquisition of the multi-turn position and/or the direction of rotation, i.e. the acquisition of part of a revolution (for example quarter, half, or complete revolutions), can be achieved via a special embodiment of the material measure 10, which appropriately interrupts the light path between the diodes and photo-receivers. In this connection the material measure 10 can be used, which is also used for the acquisition of the single-turn position.

With the application of the external voltage supply, i.e. in normal operation, the light-emitting diode arrangement 9 can, for example, be continuously energised. It can however also be operated with a variable switch-on period, such as for example periodically or pulsed with a variable frequency. It can in particular also be unenergised part of the time.

When the external voltage supply is switched off or fails, i.e. in the power-saving mode, the light-emitting diode arrangement 9 can be operated with a variable switch-on time, such as for example periodically or pulsed with a variable frequency, which is reduced compared to normal operation. The frequency of occurrence and duration of energisation can be increased with the first detected signal change.

Figure 2:
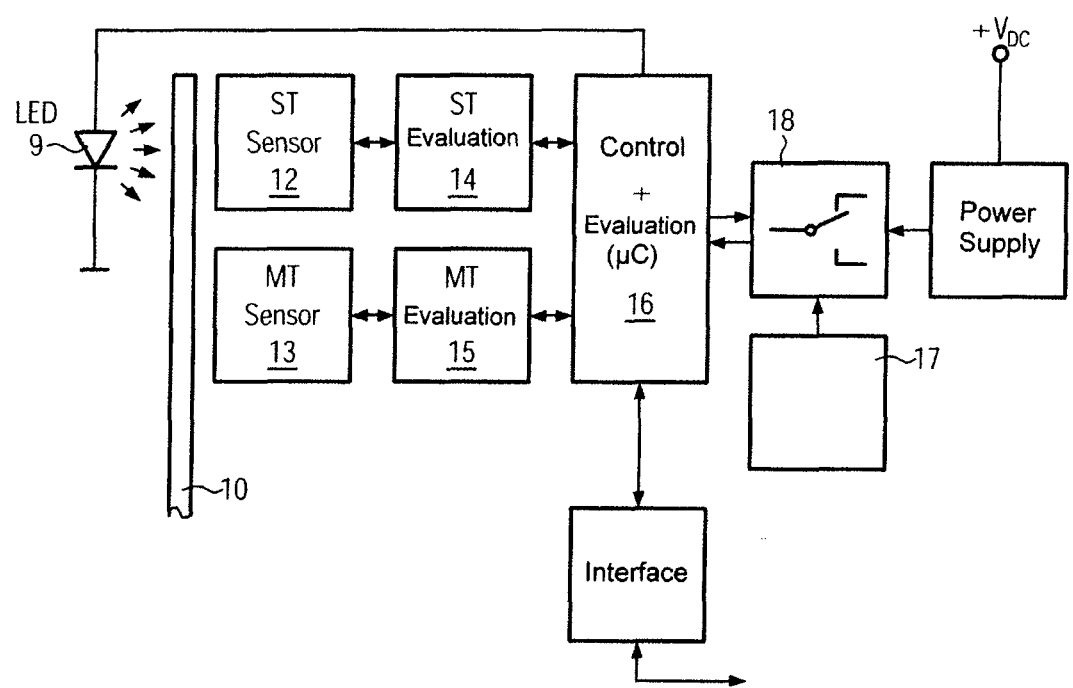
FIG. 2 illustrates a block diagram of a further example of a position transmitter according to the invention and an evaluation unit of a position transmitter according to the invention.

A particularly advantageous embodiment is when the structures necessary for the acquisition of the revolutions are also arranged on the material measure 10, thus obviating any need for an additional material measure or interrupting disc (refer to FIG. 2).

On switching off or with the failure of the external power supply the revolution counting system is supplied by a power-source. This power-source 17 can be a non-rechargeable or rechargeable battery. The power-source 17 can be integrated into the position transmitter or arranged outside of the housing of the position transmitter.

The actuation of the LED, for example, frequency, frequency of occurrence or duration of switch-on, can be dependent on the operating parameters of the position transmitter, for example on the speed and/or the acceleration of the shaft movement. To achieve this a device can be present which facilitates the determination of the speed and/or the acceleration also in the power-saving mode. In addition a plurality of operating modes, for example a plurality of operating frequencies, can be provided for controlling the LED. In this way a particularly advantageous power-saving mode can be realised, because on switching off or with failure of the external voltage supply, the shaft does not rotate or only with a low speed and acceleration.

FIG. 2 illustrates a block diagram of a further example of a position transmission device and an evaluation unit of a position transmitter according to the invention. The position transmitter is used for the absolute-value position acquisition of a pivotably supported shaft, whereby the position transmitter comprises a glass encoded disc 10 in combination with an LED 9 and a single-turn sensor 12 for the acquisition of the position within a full revolution, a multi-turn sensor 13 for the acquisition of the number of revolutions and the direction of rotation, a first evaluation unit 14 for the evaluation of the single-turn position, a second evaluation unit 15 for the evaluation of the multi-turn position and a control and evaluation unit 16. The latter can, for example, form an overall absolute value from the single-turn and the multi-turn positions and output it through an interface. Furthermore, the control and evaluation unit 16 can control the switching on and off of the LED 9, e.g. for short-term measurement intervals (pulse measurement) in the case of a mains voltage failure (as already described in conjunction with FIG. 1), whereby the control and evaluation unit 16 is then supplied with current/voltage by the power-source 17 (non-rechargeable battery or rechargeable battery).

Furthermore, FIG. 2 shows a device 18 for monitoring an external voltage supply and for switching over to the power-source 17 when the external voltage supply is switched off or fails.

An additional, optimised expansion of the system can be realised by integration of the photo-receivers in an opto-ASIC. Through the higher, achievable processing speed in the opto-ASIC the power consumption in the battery mode can be further reduced and the admissible limiting frequency of the scanning system increased.

The invention claimed is:

1. Position transmitter for the acquisition of the position of a shaft (4) which is rotatable about an axis of rotation (3), comprising:
   a first optical sensor arrangement (12) for the acquisition of a single-turn position of the shaft, and
   a second optical sensor arrangement (13) for the acquisition, in particular for gearless acquisition, of a multi-turn position of the shaft.
   a first evaluation unit (14) for evaluating the single-turn position;
   a second evaluation unit (15) for evaluating the multi-turn position; and
   a control/evaluation unit (16), for processing the single-turn position and the multi-turn position, wherein the position transmitter has at least two operating modes comprising:
      a normal mode, the position transmitter operating in the normal mode when applying an external voltage supply from an external power supply and;
      a power-saving mode, the position transmitter operating in the power-saving mode when the external power supply is switched off or fails, wherein in the normal mode the multi-turn position is determined by both the first optical sensor arrangement and the second optical sensor arrangement and a comparison of the two determined positions is carried out.

2. Position transmitter according to claim 1, which furthermore comprises an illumination device (9), in particular a light-emitting diode arrangement (9) with at least one light-emitting diode.

3. Position transmitter according to claim 1, which furthermore comprises at least one material measure (10) joined to the shaft.

4. Position transmitter according to claim 3, wherein the at least one material measure joined to the shaft comprises a first material measure (10) and a second material measure (11), wherein the first material measure is suitable for the acquisition of the single-turn position and the second material measure is suitable for the acquisition of the multi-turn position.

5. Position transmitter according to claim 4, wherein the at least one material measure has an arrangement which interrupts the light path to the second optical sensor arrangement corresponding to a part of a whole revolution.

6. Position transmitter according to claim 1, wherein the second evaluation unit (15) is a microcontroller.

7. Position transmitter according to claim 1, in which the position transmitter is configured such that in the power-saving mode at least one of the following is effectuated:
   the acquisition of the multi-turn position is solely carried out with the second optical sensor arrangement;
   at least one of the first optical sensor arrangement and the first evaluation unit is switched off.

8. Position transmitter according to claim 7, in which furthermore a power source (17), in particular in the form of a non-rechargeable battery or a rechargeable battery, and a device for monitoring external supply voltage and for changing over the power supply of the position transmitter to the power source (17) when the external power supply is switched off or fails, are provided.

9. Position transmitter according to claim 8, further comprising an illumination device, and the position transmitter being configured such that in the power-saving mode, at least one of the second sensor arrangement and the illumination device can be supplied with voltage at least part of the time.

10. Position transmitter according to claim 9, wherein at least one of the second optical sensor arrangement and the illumination device is supplied time-variably with voltage, in particular periodically or pulsed with a variable frequency.

11. Position transmitter according to claim 9, which furthermore comprises a movement measurement device, with which at least one of the speed and the acceleration of the shaft can be measured so that, depending on the measurement, the time-variable voltage supply of the illumination device, in particular at least one of the frequency, frequency of occurrence, duration of the voltage supply, can be realised.

12. Position transmitter according to claim 9, wherein the control and evaluation unit is configured to realise the time-variable voltage supply of the illumination device.

13. Position transmitter according to claim 1, wherein the first and the second optical sensor arrangements are integrated on a sensor component, in particular an ASIC.

14. Position transmitter according to claim 13, wherein the control and evaluation unit is also integrated in the ASIC.

* * * * *